(12) United States Patent
Vazirani

(10) Patent No.: US 11,739,704 B2
(45) Date of Patent: Aug. 29, 2023

(54) SYSTEMS AND METHODS FOR BURNER USE FOR LAMBDA CONTROL WITH GASOLINE ENGINE

(71) Applicant: Tenneco Automotive Operating Company Inc., Lake Forest, IL (US)

(72) Inventor: Pankaj Vazirani, Canton, MI (US)

(73) Assignee: Tenneco Automotive Operating Company Inc., Northville, MI (US)

( * ) Notice: Subject to any disclaimer, the term of this patent is extended or adjusted under 35 U.S.C. 154(b) by 0 days.

(21) Appl. No.: 17/512,845

(22) Filed: Oct. 28, 2021

(65) Prior Publication Data

US 2023/0134097 A1 May 4, 2023

(51) Int. Cl.
| | |
|---|---|
| *F01N 3/00* | (2006.01) |
| *F02D 41/14* | (2006.01) |
| *F02D 41/02* | (2006.01) |
| *F01N 3/20* | (2006.01) |
| *F01N 9/00* | (2006.01) |
| *F01N 3/10* | (2006.01) |

(52) U.S. Cl.
CPC ......... *F02D 41/1454* (2013.01); *F01N 3/101* (2013.01); *F01N 3/2033* (2013.01); *F01N 9/005* (2013.01); *F02D 41/0255* (2013.01); *F01N 2560/025* (2013.01)

(58) Field of Classification Search
CPC .... F02D 41/1454; F02D 41/0255; F01N 3/01; F01N 3/2033; F01N 9/005; F01N 2560/025
See application file for complete search history.

(56) References Cited

U.S. PATENT DOCUMENTS

| | | | |
|---|---|---|---|
| 5,277,025 A * | 1/1994 | Gonze | F01N 3/2033 60/284 |
| 9,951,673 B2 | 4/2018 | Qi et al. | |
| 10,865,676 B1 * | 12/2020 | Szczepanski | F01N 13/009 |
| 10,907,519 B2 | 2/2021 | Paukner et al. | |
| 2011/0239623 A1 * | 10/2011 | Leustek | F01N 13/009 60/274 |
| 2019/0211725 A1 * | 7/2019 | Paukner | F01N 3/101 |
| 2020/0232364 A1 * | 7/2020 | Baron Von Ceumern-Lindenstjerna | F01N 13/008 |
| 2021/0040873 A1 * | 2/2021 | Baron Von Ceumern-Lindenstjerna | F01N 13/009 |
| 2021/0254525 A1 * | 8/2021 | Kraewer | F01N 3/2006 |

FOREIGN PATENT DOCUMENTS

| | | |
|---|---|---|
| DE | 4240012 A1 | 6/1994 |
| EP | 0561311 A1 | 9/1993 |
| EP | 0813648 B1 | 9/1998 |

* cited by examiner

*Primary Examiner* — Matthew T Largi
(74) *Attorney, Agent, or Firm* — Harness, Dickey & Pierce, P.L.C.

(57) ABSTRACT

A vehicle control system includes: a fuel control module configured to control gasoline fueling of an engine in open loop based on a target engine lambda; and a burner control module configured to control gasoline fueling of a burner based on (a) a target lambda input to a three-way catalyst (TWC) in an exhaust system of the engine and (b) a lambda of exhaust input to the TWC. The burner is coupled to the exhaust system between (a) an output of the engine and (b) an input to the TWC.

20 Claims, 5 Drawing Sheets

SYSTEMS AND METHODS FOR BURNER USE FOR LAMBDA CONTROL WITH GASOLINE ENGINE

FIELD

The present disclosure relates to exhaust control systems and methods and more particularly to systems and methods for using a burner of an exhaust system to control exhaust lambda.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Air is drawn into an engine through an intake manifold. A throttle valve may adjust airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust may include nitrogen oxides (NOx), such as nitrogen oxide (NO) and nitrogen dioxide ($NO_2$), carbon oxides, such as carbon monoxide (CO) and carbon dioxide ($CO_2$), and other components. An exhaust treatment system may be used to reduce the amount of NOx and PM in the exhaust.

The exhaust treatment system may include a three way catalyst (TWC) configured to reduce the amount of one or more constituents of the exhaust before the exhaust is expelled to atmosphere. There is a need to, while minimizing cost, accurately control both (a) engine fueling based on a target exhaust lambda and (b) exhaust lambda into the TWC based on a target TWC input lambda.

SUMMARY

In a feature, a vehicle control system includes: a fuel control module configured to control gasoline fueling of an engine in open loop based on a target engine lambda; and a burner control module configured to control gasoline fueling of a burner based on (a) a target lambda input to a three-way catalyst (TWC) in an exhaust system of the engine and (b) a lambda of exhaust input to the TWC. The burner is coupled to the exhaust system between (a) an output of the engine and (b) an input to the TWC.

In further features, the fuel control module is configured to control gasoline fueling of the engine in open loop.

In further features, the burner control module is configured to control gasoline fueling of the burner to adjust the lambda of the exhaust input to the TWC toward or to the target lambda input to the TWC.

In further features, the burner includes: an air pump configured to pump air into the burner; a fuel injector configured to inject fuel into the burner; and an ignition device configured to ignite a mixture of air and fuel within the burner.

In further features, the burner control module is configured to: selectively disable the fuel injector and disable fueling into the burner; selectively disable the ignition device and disable ignition of air and fuel within the burner; and while the fuel injector and the ignition device are disabled, selectively control operation of the air pump based on (a) the target lambda input to the TWC in an exhaust system of the engine and (b) the lambda of exhaust input to the TWC.

In further features, the burner control module is configured to, while the fuel injector and the ignition device are disabled, selectively control operation of the air pump based on minimizing a difference between (a) the target lambda input to the TWC in an exhaust system of the engine and (b) the lambda of exhaust input to the TWC.

In further features, the burner control module is configured to, while the fuel injector and the ignition device are disabled, selectively control operation of the air pump based on adjusting (b) the lambda of exhaust input to the TWC toward (a) the target lambda input to the TWC in an exhaust system of the engine.

In further features, the burner control module is configured to provide fuel to the burner when a temperature of the TWC is less than a predetermined temperature.

In further features, the burner control module is configured to provide fuel to the burner for a cold start of the engine.

In further features, the burner control module is configured to control gasoline fueling of the burner in closed loop based on (a) the target lambda input to the TWC and (b) the lambda of exhaust input to the TWC.

In further features, the fuel control module is configured to, when a fault is diagnosed in the burner, control gasoline fueling of the engine further based on (a) the target lambda input to the TWC and (b) the lambda of exhaust input to the TWC.

In further features, the burner control module is configured to disable gasoline fueling of the burner when the fault is diagnosed in the burner.

In further features: the fuel control module is implemented within an engine control module; and the fuel control module is configured to receive an indicator that the fault is diagnosed in the burner from the burner control module via a controller area network (CAN) of the vehicle.

In further features, the target lambda input to the TWC is variable.

In further features, a target module is configured to selectively vary the target engine lambda based on one or more operating parameters of the vehicle.

In further features: the target module is implemented within an engine control module; the target module is configured to set the target lambda input to the TWC; and the burner control module is configured to receive the target lambda input to the TWC from the target module via a controller area network (CAN) of the vehicle.

In further features, the exhaust system includes only a lambda sensor that measures the lambda of the exhaust input to the TWC.

In further features: the burner control module is configured to receive the lambda of the exhaust input to the TWC from the lambda sensor; and the fuel control module is configured to receive the lambda of the exhaust input to the TWC from the burner control module via a controller area network (CAN) of the vehicle.

In further features, the TWC is implemented with a gasoline particulate filter (GPF) in a four way catalyst of the exhaust system.

In a feature, a vehicle control method includes: controlling gasoline fueling of an engine in open loop based on a target engine lambda; and controlling gasoline fueling of a burner based on (a) a target lambda input to a three-way catalyst (TWC) in an exhaust system of the engine and (b) a lambda of exhaust input to the TWC. The burner is coupled to the exhaust system between (a) an output of the engine and (b) an input to the TWC.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module controls opening of a throttle valve to control airflow into an engine. Air is mixed with fuel to produce an air/fuel mixture within cylinders. The engine control module also controls fueling of the engine and provision of spark to the engine. Spark initiates combustion of the air/fuel mixture to generate torque.

Exhaust is output from the engine to an exhaust system. The exhaust system may include one or more components, such as a three-way catalyst (TWC), that react with one or more exhaust constituents. A burner may be implemented in the exhaust system upstream of the TWC. The burner may include an air pump that pumps in air, a fuel injector that injects fuel, and an ignition device (e.g., a spark plug) that ignites the air/fuel mixture within the burner. The burner may be used, for example, to heat the TWC (e.g., after a cold start) and/or for one or more reasons.

The present application involves controlling fueling of the engine and fueling of the burner in parallel. Exhaust lambda (λ) input to the TWC is measured using a lambda sensor. The engine control module controls fueling of the engine to achieve a target engine lambda, such as a target engine lambda for fuel efficiency. Based on a difference between the exhaust lambda input to the TWC and a target lambda input to the TWC (e.g., 1.0), a burner control module controls fuel to the burner. For example, the burner control module controls fueling of the burner to minimize the difference between the exhaust lambda input to the TWC and a target lambda input to the TWC and/or to adjust the exhaust lambda input to the TWC toward or to the target lambda input to the TWC.

With the above, only one lambda sensor is needed, minimizing cost. Also, fueling of the engine is controlled based on the target engine lambda, which may be variable based on one or more operating conditions, while fueling of the burner can be controlled to achieve the target lambda input to the TWC.

Figure 1:
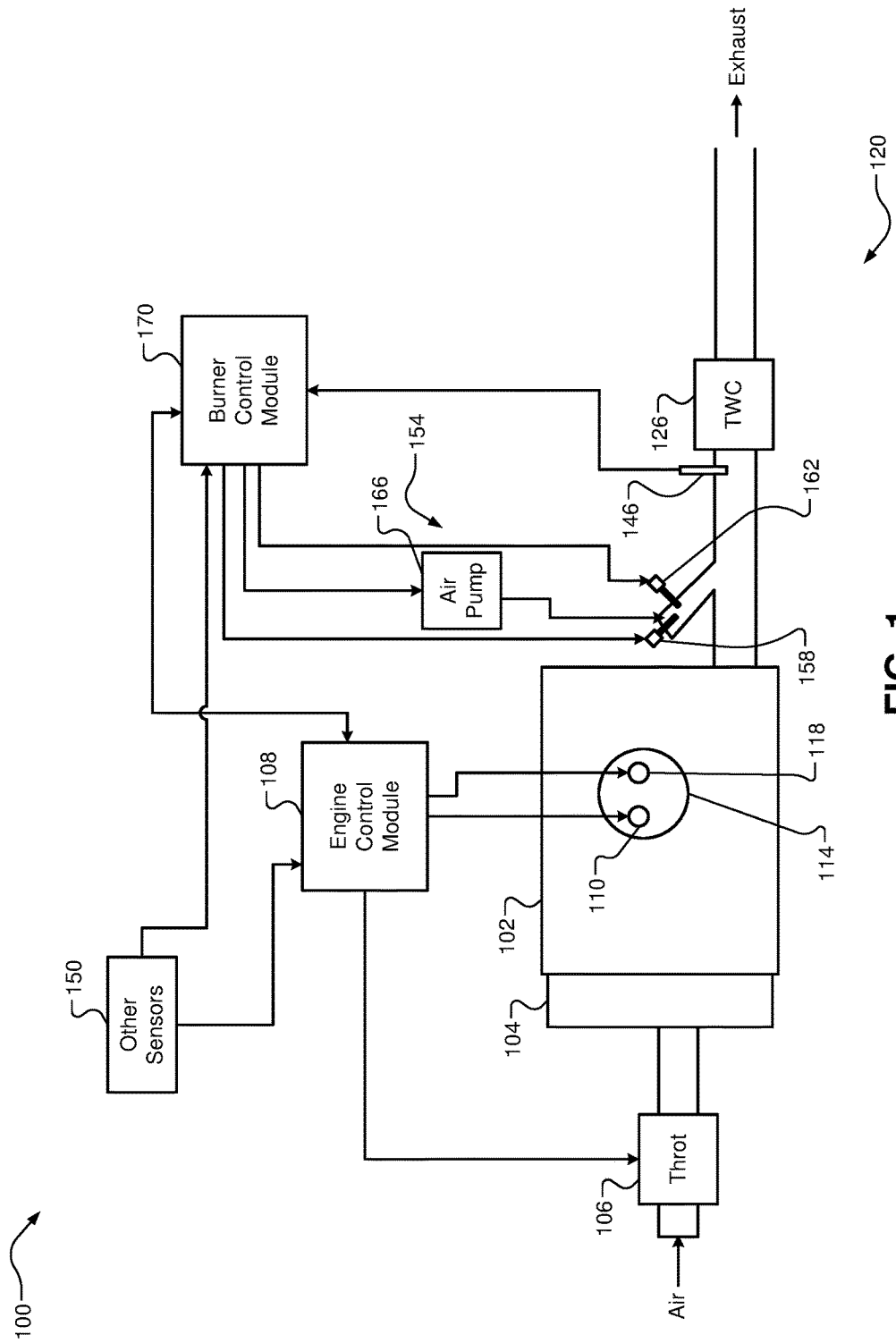
FIG. 1 is a functional block diagram of an example vehicle control system.

Referring now to FIG. 1, a functional block diagram of an example vehicle control system 100 is presented. An engine 102 generates propulsion torque for a vehicle. The vehicle may have a class 1, class 2, class 3, class 4 rating, a class 5 rating, a class 6 rating, a class 7 rating, or a class 8 rating, such as from the United States Department of Transportation (DOT). Class ratings of vehicles are based on gross vehicle weight rating (GVWR). Generally speaking, GVWR increases as class rating increases and vice versa. While the engine 102 is shown and will be discussed as a gasoline engine, the engine 102 may be another suitable type of engine. One or more electric motors (or motor-generators) may additionally generate propulsion torque.

Air is drawn into the engine 102 through an intake manifold 104. A throttle valve 106 may regulate air flow into the engine 102. One or more fuel injectors, such as fuel injector 110, inject fuel that mixes air to form an air/fuel mixture. The fuel injectors may inject fuel (e.g., gasoline) directly into cylinders, such as cylinder 114, or in another suitable location. Spark plugs, such as spark plug 118, initiate combustion of the air/fuel mixture within the cylinders.

An engine control module (ECM) 108 controls fuel injection by the fuel injectors and spark by the spark plugs. The ECM 108 also controls actuation of the throttle valve 106. The engine 102 may also include other engine actuators, such as one or more turbochargers, one or more superchargers, cam phasers, etc. Although the engine 102 is depicted as including one cylinder, the engine 102 may include more than one cylinder, such as 4, 6, 8, 10, 12, 14, or 16 cylinders. One or more fuel injectors may be provided per cylinder.

Exhaust is expelled from the engine 102 to an exhaust system 120. The exhaust (gas) may include particulate, nitrogen oxides (NOx), such as nitrogen oxide (NO) and nitrogen dioxide ($NO_2$), and other exhaust constituents. The exhaust system 120 includes a three-way catalyst (TWC) 126. While the example of the TWC 126 is shown, the present application is also applicable to the TWC 126 also including a gasoline particulate filter (GPF) and serving as a four way catalyst. The exhaust system 120 may also include one or more other components configured to reduce one or more exhaust constituents before the exhaust is expelled to atmosphere. Also, while example locations are shown, the present application is also applicable to the burner and/or the TWC 126 being in another suitable position including the exhaust pipe outlet and/or in an exhaust gas recirculation (EGR) loop.

One or more sensors may be implemented in the exhaust system 120, such as one or more NOx sensors, one or more temperature sensors, one or more oxygen sensors, and/or one or more other types of sensors. For example, a lambda sensor 146 may measure a lambda of exhaust input to the TWC 126. Other example types of sensors include a mass air flowrate (MAF) sensor, a recirculated exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors. Sensors are collectively illustrated by 150 in FIG. 1.

A burner 154 is connected to the exhaust system 120 upstream of the lambda sensor 146 and the TWC 126. The burner 154 may include a fuel injector 158, a spark plug 162, and an air pump 166. While the example of the burner 154 including a spark plug is provided, the present application is also applicable to other types of igniters and ignition devices.

When the air pump 166 is on, the air pump 166 pumps air into the burner 154 and to the exhaust system 120. The fuel injector 158 injects fuel (e.g., gasoline) that mixes with the air from the air pump 166. The spark plug 162 generates spark that ignites the air and fuel from the fuel injector 158 and the air pump 166. The combustion of the air and fuel generates hot gas, which can be used to heat one or more components of the exhaust system 120 and/or for one or more other reasons.

A burner control module 170 controls fuel injection by the fuel injector 158, spark generation by the spark plug 162, and operation of the air pump 166. In various implementations, the burner control module 170 may control a speed of the air pump 166, whether or not the burner 154 is receiving fuel for combustion. When receiving fuel, the burner control module 170 may control the speed of the air pump 166.

The engine control module (ECM) 108 controls a torque output of the engine 102. The ECM 108 also controls starting and shutdown of the engine 102. The ECM 108 may start the engine 102, for example, in response to user actuation of one or more user input devices, such as an ignition button or switch of the vehicle and/or a combination of one or more user input devices of a key fob. The ECM 108 may shut down the engine 102, for example, in response to user actuation of the one or more user input devices (e.g., the ignition button or switch) of the vehicle and/or the one or more user input devices of the key fob.

The ECM 108 controls fueling of the engine based on a target engine lambda value. The ECM 108 may vary the target engine lambda value, for example, based on one or more operating conditions. For example, the ECM 108 may set the target engine lambda value to a first predetermined value during a cold (engine) start to try to warm the TWC 126 quickly and to a second predetermined value after the cold start and to assist the burner 154 in warming the TWC 126, such as for fuel efficiency. While two example predetermined lambda values are provided, the present application is also applicable to more than 2 predetermined lambda values.

The burner control module 170 controls fuel to the burner 154 (while the ECM 108 is controlling fueling of the engine 102 based on a target engine lambda value) based on a target TWC lambda and the lambda measured by the lambda sensor 146. The burner control module 170 may control fueling of the burner 154 (while the air pump 166 is on and the spark plug 162 is providing spark) to minimize a difference between the target TWC lambda value and the lambda measured by the lambda sensor 146 and to adjust the lambda measured by the lambda sensor 146 toward the target TWC lambda. The target TWC lambda may be a fixed predetermined value, such as 1.0.

Figure 2:
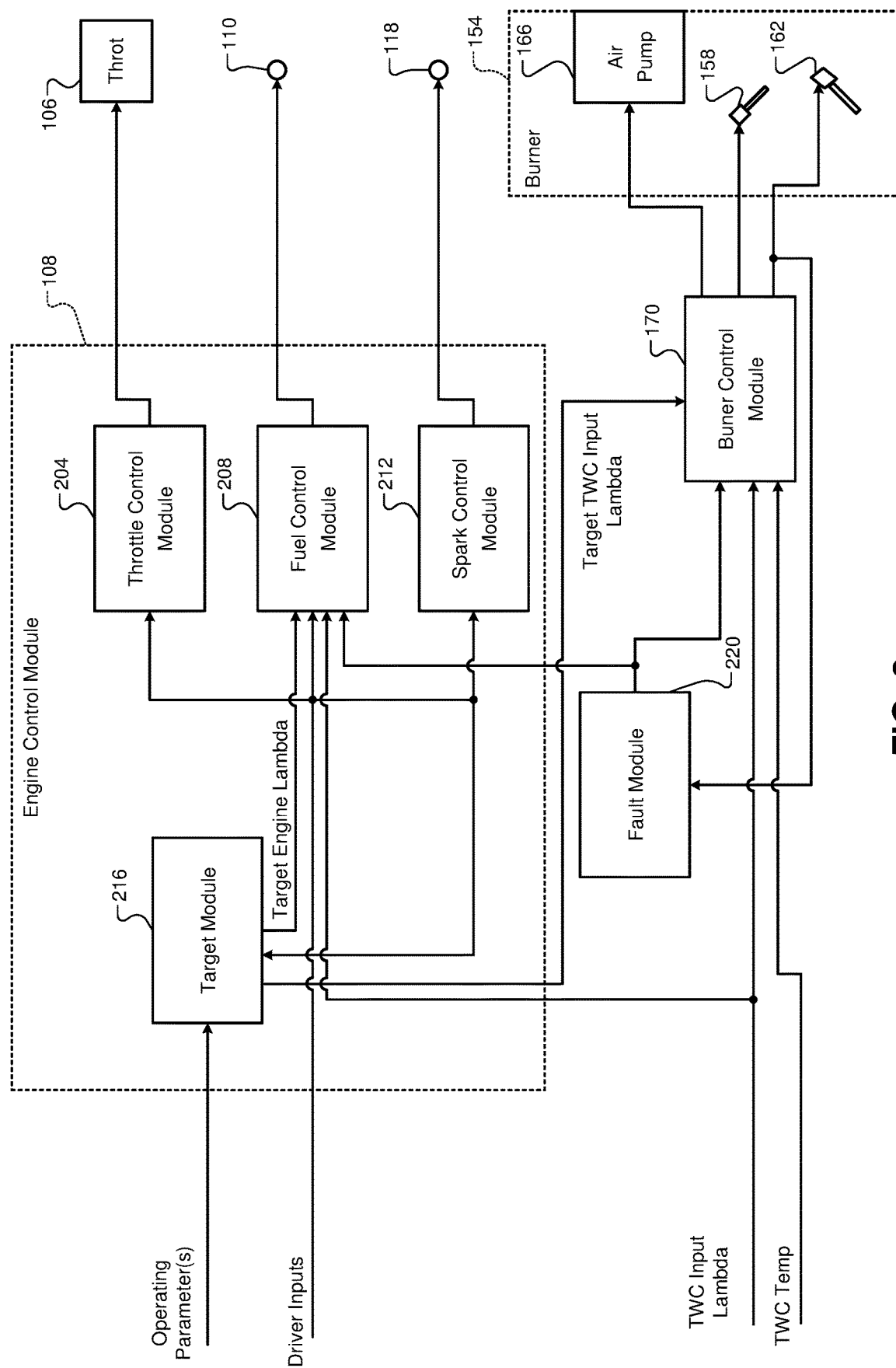
FIGS. 2 and 3 are functional block diagrams of an example engine and burner control system.
Figure 3:
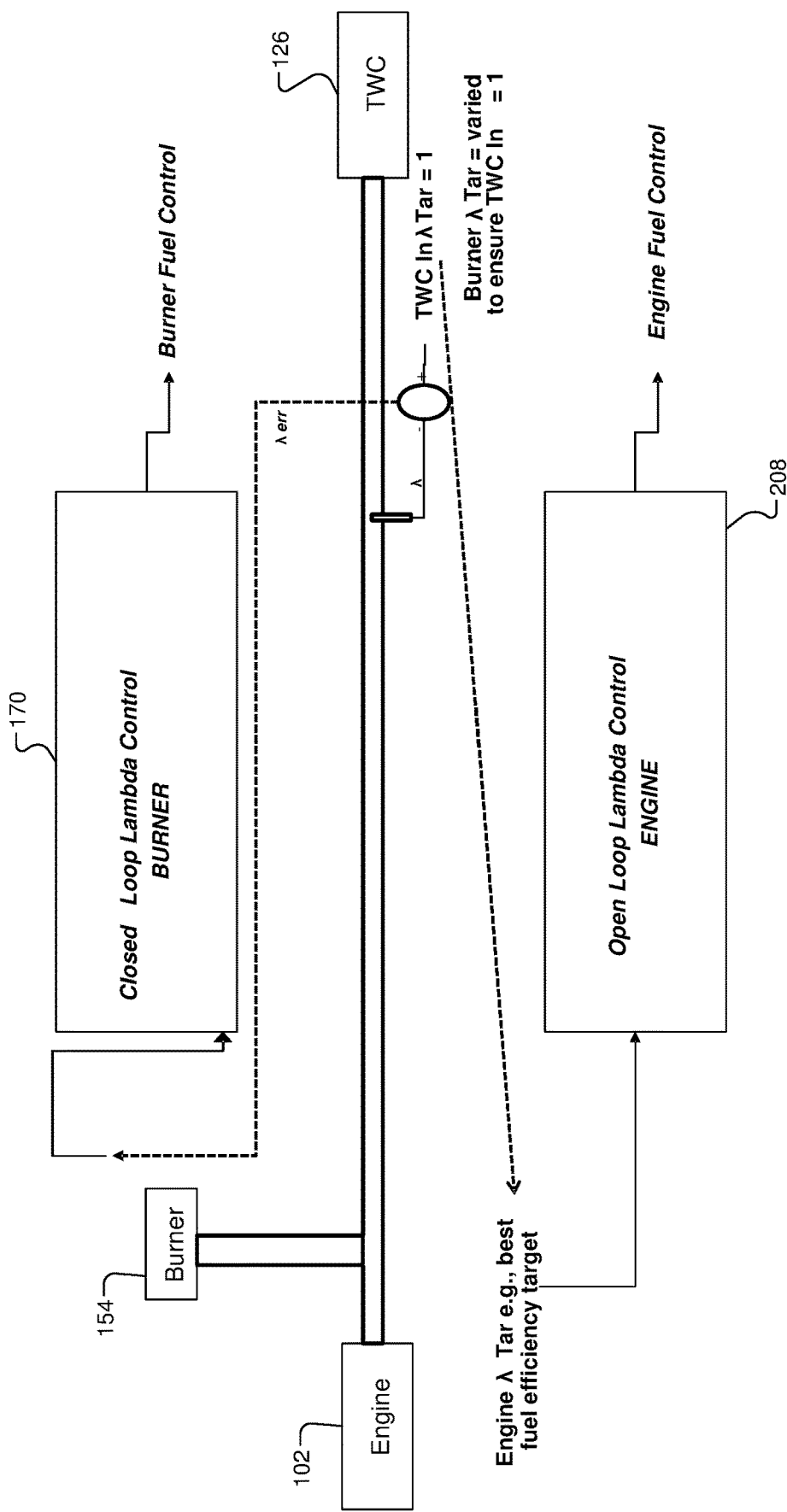

FIGS. 2 and 3 are functional block diagrams of an example engine and burner control system. The ECM 108 includes a throttle control module 204 that controls actuation of the throttle valve 106. A fuel control module 208 controls fuel injection (e.g., timing, length of injection, number of injections, etc.) to the engine 102 by the fuel injectors. A spark control module 212 controls spark (e.g., timing, duration) to the engine 102 by the spark plugs.

The throttle control module 204, the fuel control module 208, and the spark control module 212 may control opening of the throttle valve 106, fuel injection by the fuel injectors, and spark of the spark plugs, respectively, based on one or more driver inputs. Example driver inputs include, but are not limited to, accelerator pedal position, brake pedal position, clutch pedal position, autonomous driving system input, cruise control system (e.g., adaptive cruise control) input, and other driver inputs.

Additionally, the fuel control module 208 controls fueling based on or to achieve a target engine lambda (value). For example, the fuel control module 208 may control fueling of the engine 102 in open loop based on or to achieve the target engine lambda.

A target module 216 sets the target engine lambda. The target engine lambda may be a fixed predetermined value, or the target module 216 may vary the target engine lambda. For example, the target module 216 may set the target engine lambda based on one or more operating parameters. For example, the target module 216 may set the target engine lambda to a first predetermined value in response to user input to operate in a fuel efficiency mode. The target module 216 may set the target engine lambda to a second predetermined value in response to user input to operate in a sport mode. The target module 216 may set the target engine lambda to a third predetermined value for a cold start to warm up the TWC 126 (which may be referred to as catalyst light off). The target module 216 may also set the target TWC input lambda.

The burner control module 170 controls fueling of the burner 154 based on the TWC input lambda measured by the lambda sensor 146 and the target TWC input lambda. The target TWC input lambda may be a fixed predetermined value (e.g., 1.0) or may be varied. For example, a target module (e.g., the target module 216) may vary the target TWC input lambda back and forth above and below 1.0 by a predetermined amount (e.g., 0.03) or another suitable value. The target module may vary the target TWC input lambda incrementally, such as by 0.01 each predetermined period, when varying the target TWC input lambda back and forth above and below 1.0. The burner control module 170 may control fueling of the burner 154 in closed loop to adjust the TWC input lambda toward or to the target TWC input lambda and to minimize a difference between the TWC input lambda and the target TWC input lambda.

The burner control module 170 may control fueling of the burner 154 continuously while the engine 102 is running. In various implementations, the burner control module 170 may disable the burner 154 (and not provide fuel or spark) during one or more periods while the engine 102 is running. For example, the burner control module 170 may operate the burner 154 and control fueling of the burner 154 as discussed above when a temperature of the TWC 126 (TWC Temp) is less than a predetermined temperature where the TWC 126 has a conversion efficiency of at least a predetermined efficiency. Additionally, the burner control module 170 may turn on and operate the burner 154 and control fueling of the burner 154 for a predetermined period after a cold start of the engine 102 (e.g., during operation in a cold start mode).

When a fault occurs in the burner 154, the fuel control module 208 may transition to controlling fueling of the engine 102 in closed loop to adjust the TWC input lambda toward the target TWC input lambda and to minimize the difference between the TWC input lambda and the target TWC input lambda. A fault module 220 may diagnose faults in the burner 154. The fault module 220 may diagnose faults in the burner 154, for example, based on one or more operating parameters of the burner 154. For example, the fault module 220 may diagnose a fault in the burner 154 when at least one of: (1) a fault is diagnosed in the fuel injector 158 (e.g., the fuel injector 158 will not open or will not close), (2) a fault is diagnosed in the spark plug 162 (e.g., the spark plug 162 will not generate spark), (3) a fault is diagnosed in the air pump 166 (e.g., the air pump 166 will not turn on or will not turn off), and (4) the burner 154 is supposed to be combusting air and fuel yet is not. The fault module 220 may additionally or alternatively diagnose a fault in the burner 154 when one or more other predetermined fault conditions are present.

Figure 4:
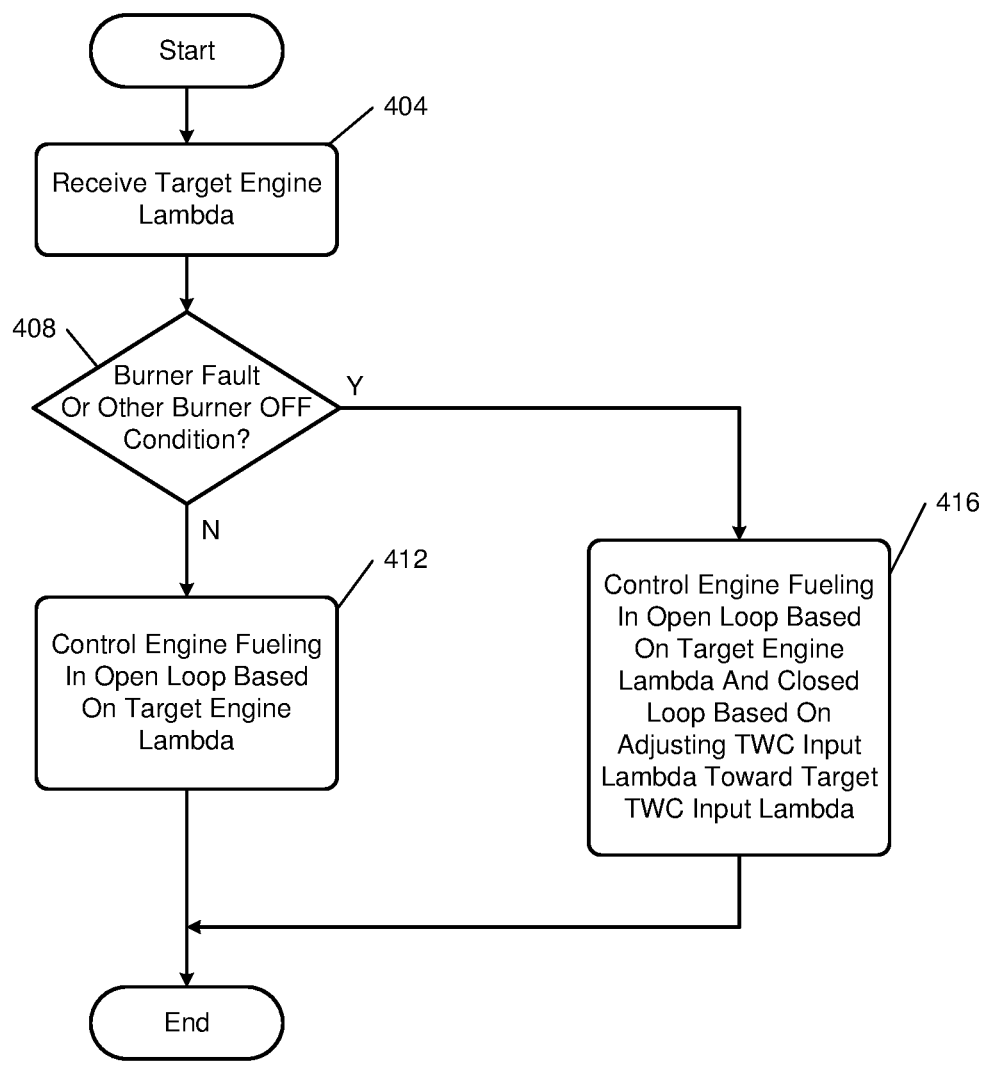
FIG. 4 is a flowchart depicting an example method of controlling fueling of an engine.
Figure 5:
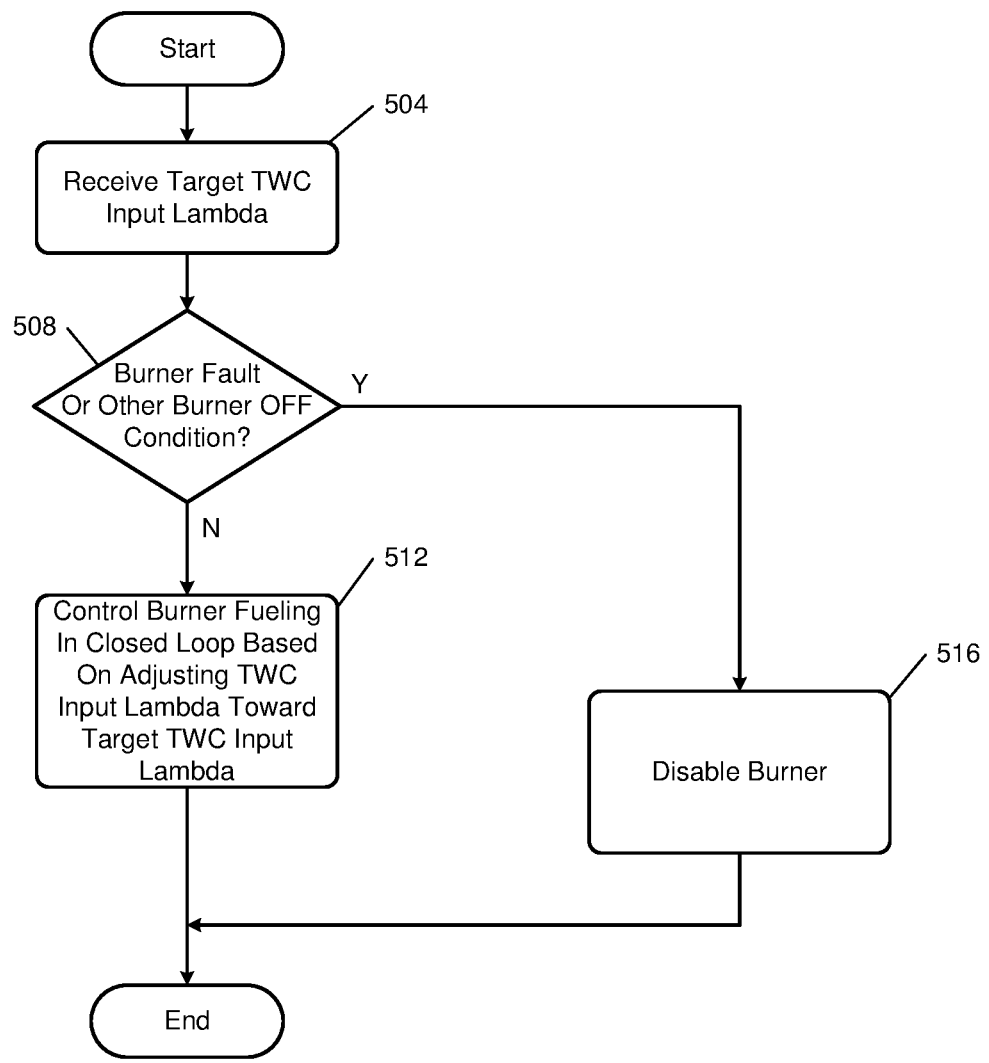
FIG. 5 is a flowchart depicting an example method of controlling fueling of a burner of an exhaust system.

FIG. 4 is a flowchart depicting an example method of engine fuel control. FIG. 5 is a flowchart depicting an example method of burner fuel control. FIGS. 4 and 5 may be executed in parallel (concurrently) such that engine fuel control and burner fuel control are controlled in parallel.

Referring now to FIG. 4, control begins with 404 where the fuel control module 208 receive the target engine lambda. The target module 216 may set the target engine lambda based on one or more operating parameters, as discussed above.

At 408, the fuel control module 208 determines whether a fault is present in the burner 154 and/or whether one or more other conditions for not operating the burner 154 is/are present. If 408 is false, control continues with 412. If 408 is true, control continues with 416. At 412, the fuel control module 208 controls fueling of the engine 102 in open loop based on achieving the target engine lambda. At 416, the fuel control module 208 controls fueling of the engine 102 in open loop based on achieving the target engine lambda and in closed loop based on adjusting the TWC input lambda toward or to the target TWC input lambda. For example, the fuel control module 208 may determine an amount of fuel to inject per combustion event based on the driver inputs. The fuel control module 208 may determine a first correction (e.g., an offset of a scalar value) based on achieving the target engine lambda and adjust the amount based on the first correction (e.g., via addition or multiplication, respectively). The fuel control module 208 may determine a second correction (e.g., an offset of a scalar value) based on adjusting the TWC input lambda toward or to the target TWC input lambda and adjust the amount based on the second correction (e.g., via addition or multiplication, respectively). In the example of 412, only the first correction may be used. While control is shown as ending, control may return to 404 for a next loop (e.g., combustion event).

Referring now to FIG. 5, control begins with 504, where the burner control module 170 receives the target TWC input lambda. The target TWC input lambda may be fixed or variable, as discussed above.

At 508, the burner control module 170 determines whether a fault is present in the burner 154 and/or whether one or more other conditions for not operating the burner 154 is/are present. If 508 is false, control continues with 512. If 508 is true, control continues with 516. At 512, the burner control module 170 controls fueling of the burner 154 in closed loop to adjust the difference (error) between the TWC input lambda and the target TWC input lambda toward zero. For example, the burner control module 170 may increase fueling of the burner 154 (relative to a last amount of fuel injected) when the TWC input lambda is less than the target TWC input lambda and decrease fueling of the burner 154 when the TWC input lambda is greater than the target TWC input lambda. At 516, the burner control module 170 disables the burner 154. For example, the burner control module 170 may disable (turn off) the air pump 166, disable fueling via the fuel injector 158, and disable spark by the spark plug 162. While control is shown as ending, control may return to 504 for a next loop (e.g., combustion event).

FIG. 5 may be performed continuously while the engine 102 is running. Alternatively, FIG. 5 may be performed only under some operating conditions, such as after a cold start, when the temperature of the TWC 126 is less than the predetermined temperature, and/or when one or more predetermined conditions are present.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), a controller area network (CAN), the Internet, a wide area network (WAN), or combinations thereof. The functionality of any given module of the present disclosure may be distributed among multiple modules that are connected via interface circuits. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control system, comprising:
   a fuel control module configured to control gasoline fueling of an engine based on a target engine lambda; and
   a burner control module configured to control gasoline fueling of a burner based on (a) a target lambda input to a three-way catalyst (TWC) in an exhaust system of the engine and (b) a lambda of exhaust input to the TWC,
   wherein the burner is coupled to the exhaust system between (a) an output of the engine and (b) an input to the TWC, and
   wherein the burner control module is further configured to:
      selectively disable a fuel injector of the burner thereby disabling fueling into the burner;
      selectively disable an ignition device of the burner thereby disabling ignition of air and fuel within the burner; and
      while the fuel injector is disabled, selectively control operation of an air pump of the burner based on (a) the target lambda input to the TWC in the exhaust system of the engine and (b) the lambda of exhaust input to the TWC.

2. The vehicle control system of claim 1 wherein the fuel control module is configured to control gasoline fueling of the engine in open loop.

3. The vehicle control system of claim 1 wherein the burner control module is configured to control gasoline fueling of the burner to adjust the lambda of the exhaust input to the TWC toward or to the target lambda input to the TWC.

4. The vehicle control system of claim 1 further comprising the burner, wherein the burner includes:
   the air pump configured to pump air into the burner;
   the fuel injector configured to inject fuel into the burner; and
   the ignition device configured to ignite a mixture of air and fuel within the burner.

5. The vehicle control system of claim 1 wherein the burner control module is configured to, while the fuel injector and the ignition device are disabled, selectively control operation of the air pump based on minimizing a difference between (a) the target lambda input to the TWC in an exhaust system of the engine and (b) the lambda of exhaust input to the TWC.

6. The vehicle control system of claim 1 wherein the burner control module is configured to, while the fuel injector and the ignition device are disabled, selectively control operation of the air pump based on adjusting (b) the lambda of exhaust input to the TWC toward (a) the target lambda input to the TWC in an exhaust system of the engine.

7. The vehicle control system of claim 1 wherein the burner control module is configured to provide fuel to the burner when a temperature of the TWC is less than a predetermined temperature.

8. The vehicle control system of claim 1 wherein the burner control module is configured to provide fuel to the burner for a cold start of the engine.

9. The vehicle control system of claim 1 wherein the burner control module is configured to control gasoline fueling of the burner in closed loop based on (a) the target lambda input to the TWC and (b) the lambda of exhaust input to the TWC.

10. The vehicle control system of claim 1 wherein the fuel control module is configured to, when a fault is diagnosed in the burner, control gasoline fueling of the engine further based on (a) the target lambda input to the TWC and (b) the lambda of exhaust input to the TWC.

11. The vehicle control system of claim 10 wherein the burner control module is configured to disable gasoline fueling of the burner when the fault is diagnosed in the burner.

12. The vehicle control system of claim 11 wherein:
the fuel control module is implemented within an engine control module; and
the fuel control module is configured to receive an indicator that the fault is diagnosed in the burner from the burner control module via a controller area network (CAN) of the vehicle.

13. The vehicle control system of claim 1 wherein the target lambda input to the TWC is variable.

14. The vehicle control system of claim 1 further comprising a target module configured to selectively vary the target engine lambda based on one or more operating parameters of the vehicle.

15. The vehicle control system of claim 14 wherein:
the target module is implemented within an engine control module;
the target module is configured to set the target lambda input to the TWC; and
the burner control module is configured to receive the target lambda input to the TWC from the target module via a controller area network (CAN) of the vehicle.

16. The vehicle control system of claim 1 wherein the exhaust system includes only a lambda sensor that measures the lambda of the exhaust input to the TWC.

17. The vehicle control system of claim 16 wherein:
the burner control module is configured to receive the lambda of the exhaust input to the TWC from the lambda sensor; and
the fuel control module is configured to receive the lambda of the exhaust input to the TWC from the burner control module via a controller area network (CAN) of the vehicle.

18. The vehicle control system of claim 1 wherein the TWC is implemented with a gasoline particulate filter (GPF) in a four way catalyst of the exhaust system.

19. A vehicle control method, comprising:
controlling gasoline fueling of an engine based on a target engine lambda;
controlling gasoline fueling of a burner based on (a) a target lambda input to a three-way catalyst (TWC) in an exhaust system of the engine and (b) a lambda of exhaust input to the TWC,
wherein the burner is coupled to the exhaust system between (a) an output of the engine and (b) an input to the TWC,
selectively disabling a fuel injector of the burner thereby disabling fueling into the burner;
selectively disabling an ignition device of the burner thereby disabling ignition of air and fuel within the burner; and
while the fuel injector is disabled, selectively controlling operation of an air pump of the burner based on (a) the target lambda input to the TWC in the exhaust system of the engine and (b) the lambda of exhaust input to the TWC.

20. A vehicle control system, comprising:
a fuel control module configured to control gasoline fueling of an engine based on a target engine lambda; and
a burner control module configured to control gasoline fueling of a burner based on (a) a target lambda input to a three-way catalyst (TWC) in an exhaust system of the engine and (b) a lambda of exhaust input to the TWC,
wherein the burner is coupled to the exhaust system between (a) an output of the engine and (b) an input to the TWC, and
wherein the fuel control module is configured to, when a fault is diagnosed in the burner, control gasoline fueling of the engine further based on (a) the target lambda input to the TWC and (b) the lambda of exhaust input to the TWC.

* * * * *